(12) United States Patent
Graham

(10) Patent No.: US 7,196,636 B2
(45) Date of Patent: Mar. 27, 2007

(54) RAILROAD CROSSING WARNING SYSTEM

(76) Inventor: Kevin M. Graham, 1307 S. Jefferson Ave., Springfield, MO (US) 65807

(*) Notice: Subject to any disclaimer, the term of this patent is extended or adjusted under 35 U.S.C. 154(b) by 0 days.

(21) Appl. No.: 10/785,675

(22) Filed: Feb. 24, 2004

(65) Prior Publication Data

US 2005/0184883 A1   Aug. 25, 2005

(51) Int. Cl.
  *G08G 1/01*   (2006.01)
(52) U.S. Cl. ............ 340/933; 340/554; 340/907; 340/993; 246/122 R; 246/292; 246/473 R
(58) Field of Classification Search .......... 340/933, 340/903, 904, 907, 993, 435; 246/292–296, 246/166, 167 R, 1 R, 13, 122 R, 217, 473 R, 246/473.1; 701/119; 180/14.1
  See application file for complete search history.

(56) References Cited

U.S. PATENT DOCUMENTS

| | | | |
|---|---|---|---|
| 3,758,775 A | 9/1973 | Hopkins | 246/125 |
| 5,554,982 A | 9/1996 | Shirkey et al. | 340/903 |
| 5,825,412 A * | 10/1998 | Hobson et al. | 348/149 |
| 5,890,682 A | 4/1999 | Welk | 246/125 |
| 5,902,341 A * | 5/1999 | Wilson | 342/357.08 |
| 5,924,652 A * | 7/1999 | Ballinger | 246/126 |
| 5,954,299 A * | 9/1999 | Pace | 246/293 |
| 6,179,252 B1* | 1/2001 | Roop et al. | 246/293 |
| 6,323,785 B1 | 11/2001 | Nickell et al. | 340/933 |
| 6,340,139 B1 | 1/2002 | Hilleary | 246/292 |
| 6,457,682 B2 * | 10/2002 | Anderson et al. | 246/292 |

* cited by examiner

Primary Examiner—Davetta W. Goins
(74) Attorney, Agent, or Firm—WM Bruce Day

(57) ABSTRACT

A highway/railroad crossing detection and warning system which uses sets of Doppler radar transmitters and receivers to detect the approach of a train coming from either direction toward a highway crossing. The Doppler radar sets are located an extended distance from the crossing with each set detecting movement toward and away from its location. Presence detectors are located at the crossing and sense moving or stationary trains. All detector devices transmit signals to warning equipment to provide aural and visual indications to approaching motorists or work crews.

1 Claim, 5 Drawing Sheets

RAILROAD CROSSING WARNING SYSTEM

FIELD OF THE INVENTION

This invention relates to highway/railroad crossing warning systems, and particularly to remote sensing of train traffic approaching such crossings.

BACKGROUND OF THE INVENTION

Railroad crossings have long been dangerous for motorists because inattention, failure to see approaching trains, or failure to correctly judge the speed of approaching trains can lead to catastrophic accidents and loss of life. Some studies have shown that the cause of two-thirds of the rail associated deaths in the United States are highway/railway crossing accidents. These studies provide evidence that thousands of people die in crossing accidents every year, with approximately fifty percent of the crossing accidents resulting in death. Many highway/railroad crossings still have only passive warning signs, but increasing numbers today have active protection and include active warning devices located an extended distance from the crossing to provide adequate warning.

Conventional warning systems typically use an electric connection across the rails of an electrically isolated section of track. A detector is wired across the tracks so that when the train enters the isolated section, the tracks form a closed circuit and the detector receives a signal to indicate the presence of a train. A controller connected to the detector by long, in-ground wires, senses the short-circuit as the presence of a train and activates the signal devices. These hard-wired connections are subject to many faults and, like any electrical connections, are subject to being shorted out by water, ice, corrosion or other problems.

OBJECTS OF THE INVENTION

The objects of the present invention are: to provide a highway/railroad crossing detection and warning system which is capable of being used at extended distances from the crossing to provide warning of trains; to provide such a detection and warning system which does not require hard-wiring and buried underground cables, which can lead to faults or erroneous signals; to provide such a crossing and warning system which provides long distance warning of the approach of trains; and to provide such a crossing and warning system which is effective in use and not readily subject to electrical shorts and other malfunctions. Other objects and advantages of the invention will become apparent from the following disclosure.

SUMMARY OF THE INVENTION

A highway/railroad crossing detection and warning system uses a Doppler radar transmitter and receiving warning system arrayed around a crossing site to detect movement of a train approaching the crossing. The radar warning system uses two sets of first and second transmitter/receiver units respectively positioned adjacent the railroad track and located an extended distance from the crossing. One set is positioned on the track direction side of the crossing, and the other set on the other track direction side of the crossing. The first transmitter/receiver unit of each set is directed away from the crossing and the second transmitter/receiver unit of each set is directed toward the crossing. The radar warning system provides long distance detection of moving trains.

For detection of stationary or near stationary trains at the crossing, a presence detection system is situated at the crossing site and comprises presence detector units respectively positioned adjacent the railroad track and located a close distance from the crossing. Warning signal devices at the crossing are positioned for providing aural and visual warning to motorists and work crews. A wireless communication device transmits and receives signals between the radar warning system and the presence detection warning system to the warning signal devices to control their actuation. The system is powered by solar panel arrays and storage batteries so as to avoid running utility lines to the crossing.

DESCRIPTION OF THE PREFERRED EMBODIMENT

Figure 1:
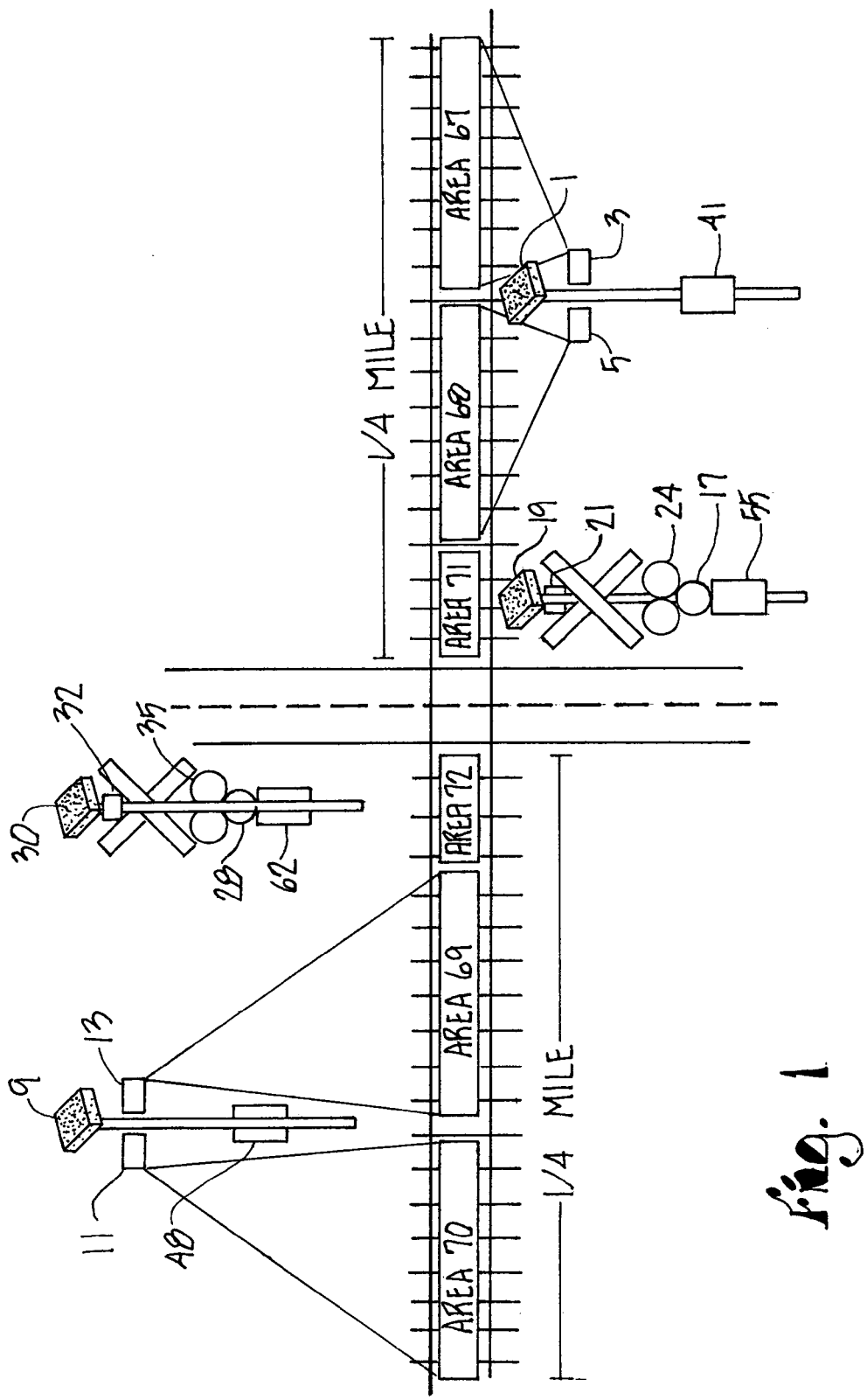
FIG. 1 is a plan view of the general layout of a highway/railroad crossing system of the present invention.

In general, the highway/railroad crossing warning system consists of two complete sets of warning signals such as comprising bell 17, 28 and beacon 24, 35, presence detectors 21, 32, and motion detectors 3, 5 and 11,13. Each set of warning signals, presence detectors, and motion detectors with associated power and control equipment, is arrayed on a side, such as a left direction track side or right direction track side of a highway/railroad crossing. Each set is preferably self-powered, such as by a solar electrical powered system with a battery storage device. Each side also contains its own computer and transmitters relaying information to the warning signals when the movement or presence of train is detected along the track. Although the disclosed system can use regular utility power, solar power is preferred for many installations that are remote from utility lines.

The warning signals provide warning signals to motorists or work crews on the roadway approaching the intersection of the railroad track with the roadway or, in the case of work crews, who are working in the immediate area of the tracks. The warning signals are preferably both aural, such as a bell 17, 28 or siren, and visual, such as a flashing beacon 24, 35. Warning signals may also include an arm which is activated to swing downwardly and across the traffic lane.

In the preferred embodiment, there are four separate solar power systems powering the warning system. Each consists of a battery cabinet containing storage batteries 39,46,53,60 and mounting solar panel arrays 1,9,19,30. The solar panel arrays may vary in wattage from 40 to 70 watts and the number and size of the panels is determined by the geographical location of motion detector units 3, 5 and 11,13, which may vary in power requirements. The solar panels convert sunlight to electrical energy, which is then used to charge the storage batteries located in a battery cabinet. A solar controller, such as a Prostar 15, controls the charging and discharging of the batteries. A charging algorithm is designed into the solar controller to prevent overcharging of the batteries and will detach the load if the battery voltage reaches 11.4 volts DC. The safeguard protects the battery from damage caused by overcharging and/or over-discharging.

The detection system consists of presence detectors 21, 32 and motion detectors 3, 5 and 11,13 arrayed so as to detect the presence and/or movement of trains on the track. The presence detector 21, 32 is preferably a MS Sedco TC3O, or equivalent which provides an ultrasonic detection at 49.75 Khz in a conical projection pattern. The presence detector 21, 32 senses the presence of rail traffic in the intersection of the track with the highway and causes the warning signals to continue emitting warning signals from activation by motion detectors or to activate upon detection of the presence of rail traffic. The presence detector 21,32 outputs a signal which is applied to a logic circuit and to a radio transmitter, such as a linear radio XT-1H. The logic circuit sends a pulse to a latching circuit. After sending the signal to the latching circuit, the logic circuit locks out the signal from the presence detector for a period of time, such as ten seconds. After the period is expired, the logic detector checks for the presence of an output from the presence detector and if present, sends a pulse to the latching circuit. If no signal is present at the output of the presence detector, no pulse is sent to the latching circuit. Concurrently, the radio transmitter transmits a signal to a radio receiver in the second warning signal system, which is usually located on the opposite side of the track on the railroad crossing and is so shown in FIG. 1.

A radio receiver performs a similar function to the presence detector, but receives its input from a transmitter in the motion detector system 3, 5 and 11, 13. As long as the motion detector is detecting rail traffic motion in the direction of the crossing, the radio receiver in the flashing beacon system will receive a transmitter signal from the transmitter. The radio receiver outputs a pulse to the latching circuit.

The latching circuit processes the pulse from either the radio receiver or from the presence detector and outputs a signal to the warning signal system. The latching circuit latches this signal in the on position so that the beacons flash in an alternating or wig-wag pattern. The output will continue to be applied to the flasher until the timer times out and disconnects the power to the latching circuit. The timer is set to disconnect power to the latching circuit after a period of time, such as twenty seconds. To allow rail traffic sufficient time to pass safely through the intersection, each new signal received from either the radio receiver from the motion detector via the radio transmitter, or from the presence detector, causes the timer to reset to, for example, twenty seconds. Thus, the flasher will continue to cause the beacons to flash until twenty seconds have elapsed after the last detection of rail traffic presence or motion.

The presence detectors 21 and 32 are located in the immediate areas of the highway/railroad crossing. The motion detectors are located a substantial distance away from the crossing, such as ¼ mile and may be located any distance which is in line of sight range of the receiver equipment located at the crossing. As a system provides a presence detector on each side of the crossing, it also provides a motion detector on each side of the crossing.

The motion detector, being remotely positioned from the crossing, is part of a system that consists of a solar panel, mounting rack, battery cabinet, back panel with solar controller, radio transmitter, motion detector, detection logic circuit, battery, aluminum pole assembly with break away base and associated wiring.

A motion detector, such as a MS Sedco 26B, senses the motion of rail traffic coming toward or away from the motion detector. The motion detector is preferably a Doppler radar transmitter/receiver unit. The motion detector receiver unit transmits a signal via wiring to a logic circuit which then sends a pulse to a transmitter located with the motion detection system and remotely positioned from the crossing. The transmitter may be a linear radio XT-1H and the transmitter transmits a coded signal to a receiver located in the warning signal unit. As long as motion is present, either toward or away from the remotely positioned motion detector 3, 5 and 11, 13 the motion detector system transmits a signal. Since the transmitter must be pulsed to transmit, the logic circuit locks out the output of the motion detector for five seconds. After five seconds, the logic detector polls the motion detector for the presence of a signal. If a signal is present, it again pulses the transmitter to transmit a signal to the receiver located at the warning signal unit. If no signal is present, no pulse is sent to the transmitter.

The remotely positioned solar assembly is substantially identical to the solar assembly located at the crossing. The entire power system, with the exception of solar panels, is located in the battery cabinet. One or more solar panels are mounted on the same pole as the battery cabinet and may vary in wattage from 40 to 70 watts. The number and size of the panels is determined by the sunlight available at the various latitudes.

Figure 2:
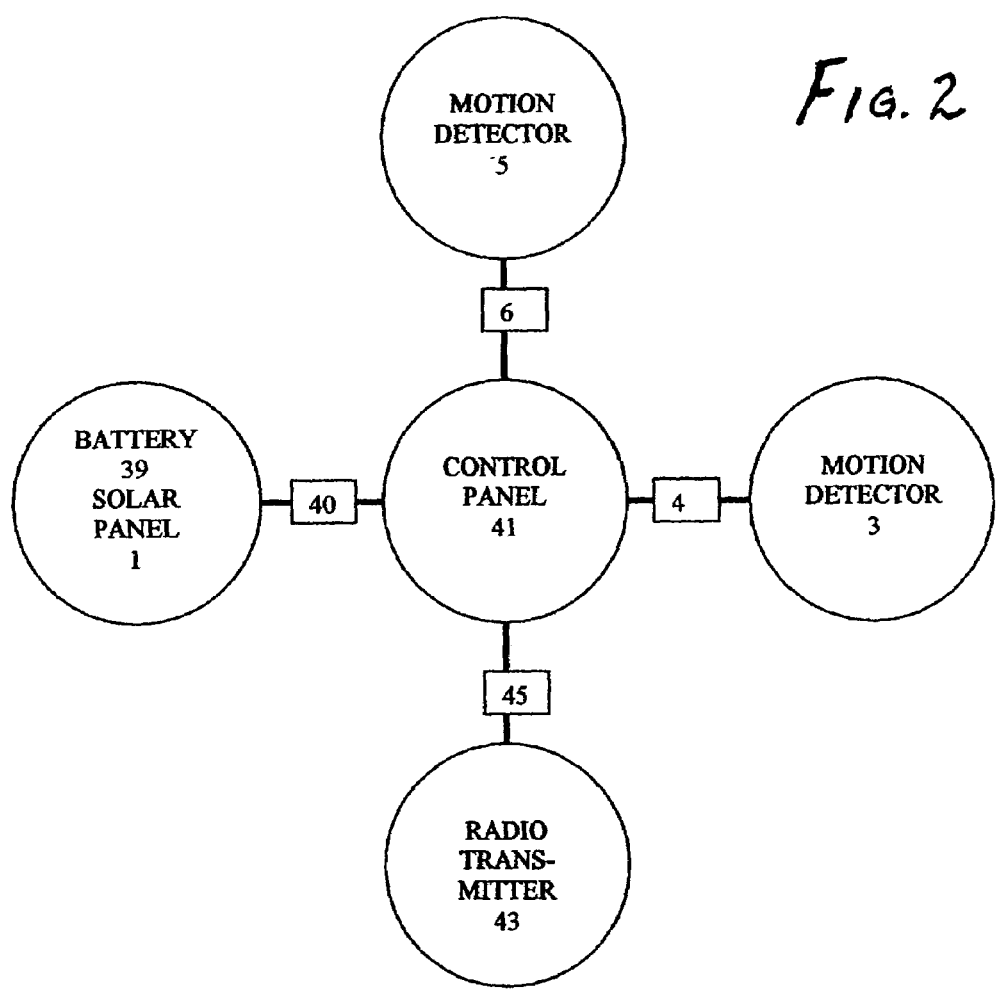
FIG. 2 is a diagrammatic view of a motion detector system on a right track side of the crossing.
Figure 3:
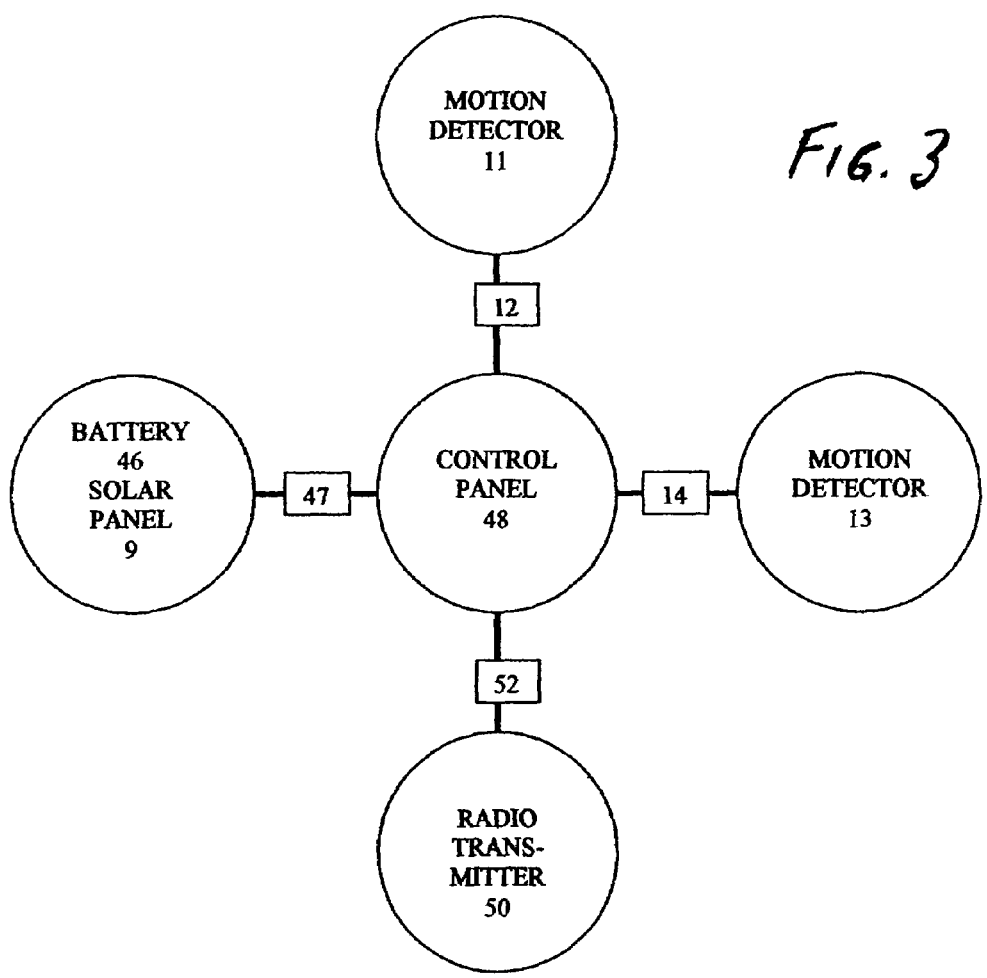
FIG. 3 is a diagrammatic view of a motion detection system on a left track side of the crossing.
Figure 4:
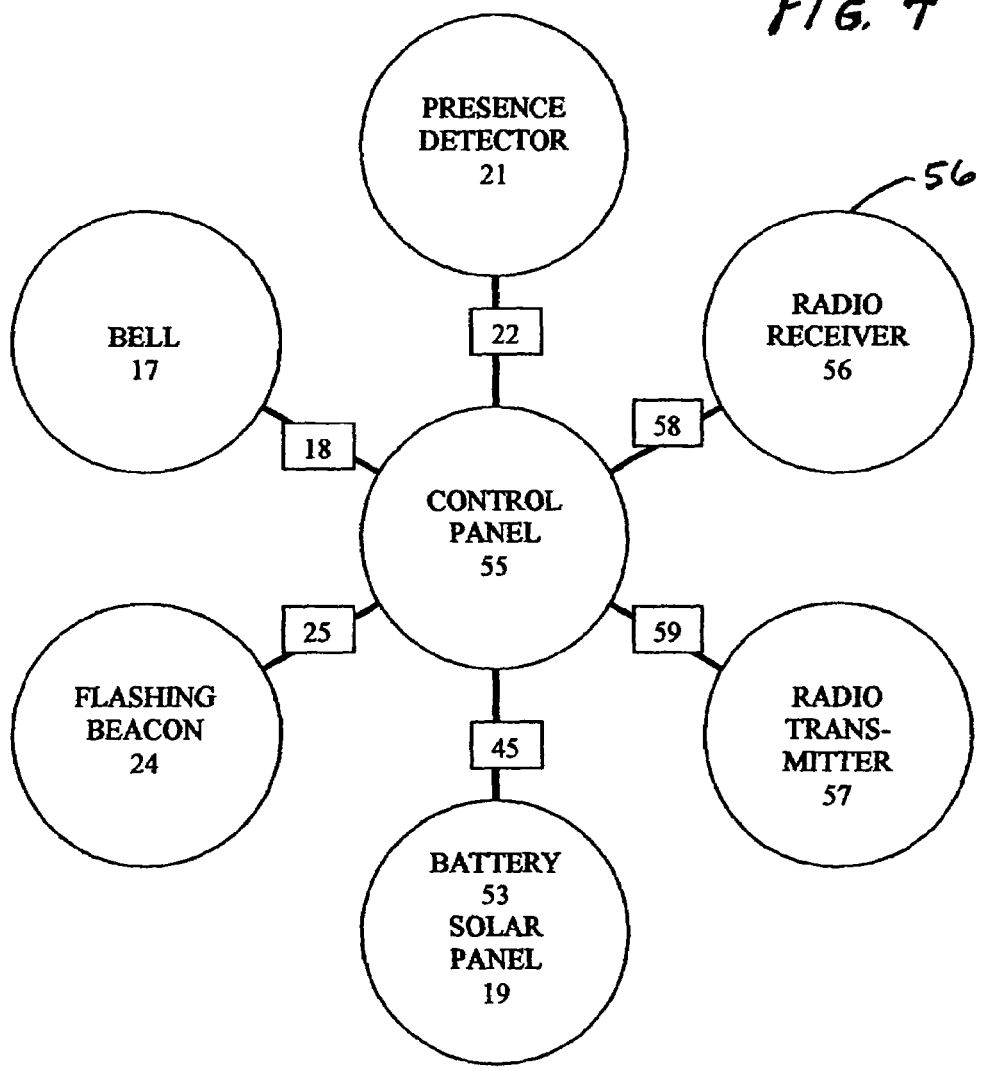
FIG. 4 is a diagrammatic view of a presence detector system on a right track side of the crossing.
Figure 5:
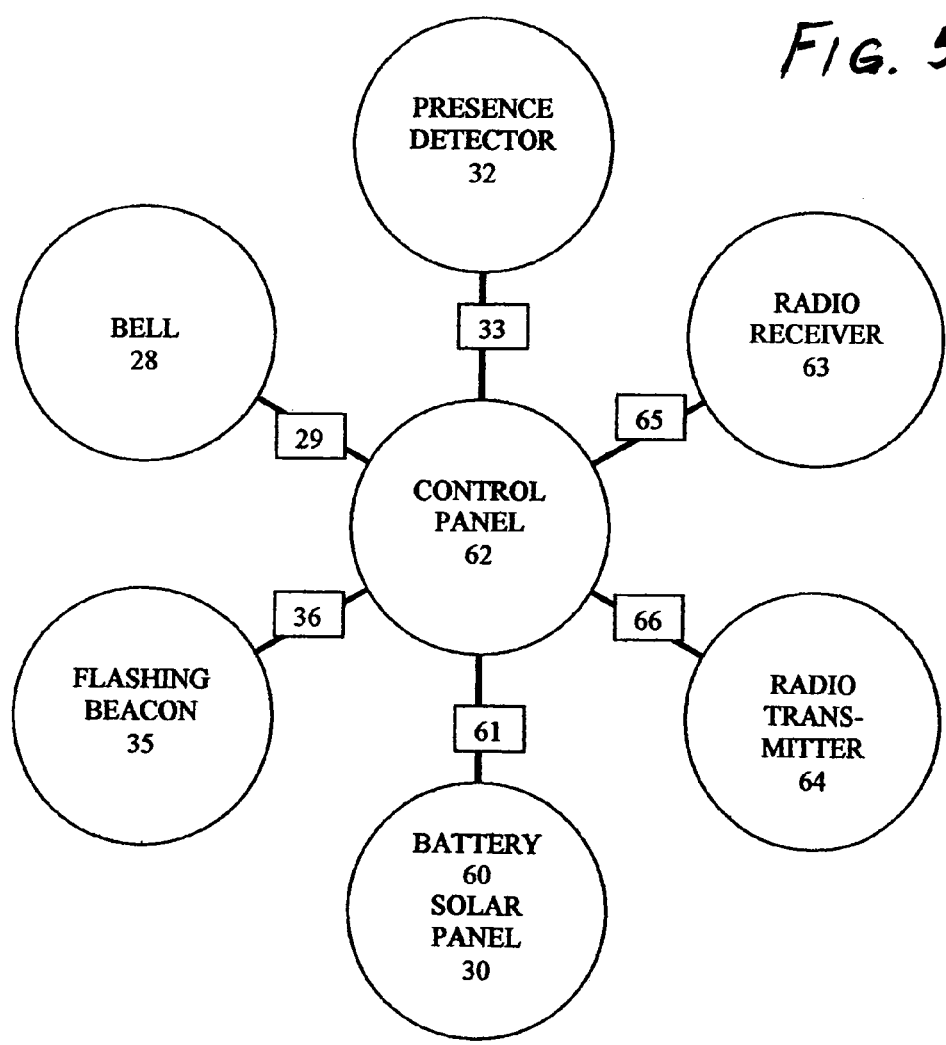
FIG. 5 is a diagrammatic view of a presence detector system on a left track side of the crossing.

In operation, when moving rail traffic comes into view of the motion detector 3 remotely located from the crossing, such as area 67, the motion detector 3 is programmed to activate the warning system when the rail traffic's movement is toward the protected crossing by continuously sending an electronic signal to a control panel 41, FIG. 2., through a hard wire 4. The control panel 41 electronically signals the radio transmitter 43 through wire 45. The radio transmitter 43 broadcasts a signal to radio receivers 56 and 63, FIGS. 4 and 5. The radio receivers 56 and 63 electronically signal control panels 55 and 62 through wires 58 and 65. Control panels 55 and 62 activate the flashing beacons 24 and 35 through wires 25 and 36 and bells 17 and 28 through wires 18 and 29.

Referring again to FIG. 1, when moving rail traffic occupies the detection area 68, that is, moving away from the position of the motion detector 5, the other directional transmitter/receiver unit therein directed toward the area 68 is programmed to activate the highway/railroad crossing system only when the rail traffic's movement is toward the protected crossing by continuously sending an electronic signal to control panel 41 through wire 6. Control panel 41 electronically signals a radio transmitter 43 through wire 45. The radio transmitter 43 broadcasts a signal to radio receivers 56 and 63. Radio receivers 56 and 63 electronically signal control panels 55 and 62 through wires 58 and 65. The control panels 55 and 62 activate flashing beacons 24 and 35 through wires 25 and 36 and bells 17 and 28 through wires 18 and 29.

Turning to the other side of the crossing, when moving rail traffic occupies the detection area 70, as it would when approaching the motion detector 11 on that side, the motion detector is programmed to activate the highway/railroad crossing system only when the rail traffic's movement is toward the protected crossing by continuously sending an electronic signal to the control panel 48 through wire 12. The control panel 48 electronically signals a radio transmitter 50 through wire 52. A radio transmitter 50 broadcasts a signal to radio receivers 56 and 63. The radio receivers 56 and 63 electronically signal control panels 55 and 62 through wires 58 and 65. The control panels 55 and 62 activate flashing beacons 24 and 35 through wires 25 and 36 and bells 17 and 28 through wires 18 and 29. When moving rail traffic occupies the detection area 69, that is away from the location of the motion detector 13, the motion detector 13 is programmed to activate the highway/railroad crossing system only when rail traffic's movement is toward the protected crossing by continuously sending an electronic signal to control panel 48 through wire 14. Control panel 48 electronically signals radio transmitter 50 through a wire 52. The radio transmitter 50 broadcasts a signal to radio receivers 56 and 63. Radio receivers 56 and 63 electronically signal control panels 55 and 62 through wires 58 and 65. Control panels 55 and 62 activate flashing beacons 24 and 35 through wires 25 and 36 and bells 17 and 28 through wires 18 and 29.

The presence detectors have a close-in range. Referring to presence detection area 71, on the right side of the crossing, FIG. 1, the presence detector 21, FIG. 4, electronically signals the control panel 55 through a wire 22. Control panel 55 electronically signals radio transmitter 57 through wire 59. Radio transmitter 57 broadcasts a signal to radio receiver 63. Radio receiver 63 electronically signals control panel 62 through wire 65. Control panel 55 maintains the activation of flashing beacon 24 through wire 25 and activation of bell 17 through wire 18 until the signal from the presence detector 21 ceases. Control panel 62 maintains the activation of a flashing beacon 35 through wire 36 and the activation of bell 28 through wire 29 until the signal broadcast from the radio transmitter 57 ceases.

When the rail traffic occupies the close-in presence detector area 72, the presence detector 32 electronically signals control panel 62 through wire 33. Control panel 62 electronically signals radio transmitter 64 through wire 66. Radio transmitter 64 broadcasts a signal to radio receiver 56. Radio receiver 56 electronically signals control panel 55 through wire 58. Control panel 62 maintains the activation of flashing beacon 35 through wire 36 and activation of bell 28 through wire 29 until the signal from the presence detector 32 ceases. The control panel 55 maintains the activation of the flashing beacon 24 through the wire 25 and the activation of bell 17 through wire 18 until the signal broadcast from radio transmitter 64 ceases.

The invention as disclosed here may be practiced in various forms and the invention is not to be limited to the specific embodiment disclosed herein, except insofar as set forth in the following claims.

What is claimed and desired to be secured by Letters Patent is:

1. A highway/railroad crossing detection and warning system comprising:
    (a) Doppler radar transmitter and receiver motion detectors detecting movement of rail traffic toward and away from a crossing site, said motion detectors extending upwardly above a ground surface and positioned separate from and adjacent to a railroad track and characterized by the absence of operational attachment to either rails, cross ties or roadbed of said railroad track;
    (b) warning signal devices at the crossing site, the motion detectors communicating with the warning signal devices to activate them and warn persons of rail traffic approaching the crossing site, and deactivate them when said rail traffic departs the crossing site; and
    (c) a presence detector extending upwardly above a ground surface and positioned separate from and adjacent to a railroad track and characterized by the absence of operational attachment to either rails, cross ties or roadbed of said railroad track, the presence detector detecting rail traffic obstructing the crossing, the presence detector communicating with the warning signal devices to prevent deactivation of the warning signal devices when rail traffic stops and occupies the crossing site.

* * * * *